US011262126B2

(12) United States Patent
Williams et al.

(10) Patent No.: US 11,262,126 B2
(45) Date of Patent: Mar. 1, 2022

(54) DRYING SYSTEM FOR A VEHICLE

(71) Applicant: Toyota Motor Engineering & Manufacturing North America, Inc., Plano, TX (US)

(72) Inventors: Paxton S. Williams, Milan, MI (US); Scott Louis Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 325 days.

(21) Appl. No.: 16/539,301

(22) Filed: Aug. 13, 2019

(65) Prior Publication Data

US 2021/0048248 A1 Feb. 18, 2021

(51) Int. Cl.
*B60H 1/34* (2006.01)
*F26B 19/00* (2006.01)

(52) U.S. Cl.
CPC .................................. *F26B 19/005* (2013.01)

(58) Field of Classification Search
CPC ........ F26B 19/005; F26B 3/06; F26B 21/004; F26B 21/001
USPC ................................ 454/152, 141, 146, 143
See application file for complete search history.

(56) References Cited

U.S. PATENT DOCUMENTS

| | | | | |
|---|---|---|---|---|
| 3,481,483 | A | 12/1969 | Harvey et al. | |
| 4,941,602 | A | 7/1990 | Wells | |
| 9,290,133 | B1 | 3/2016 | Bishop | |
| 10,093,150 | B2 * | 10/2018 | Waldner | B60H 1/248 |
| 10,807,452 | B2 * | 10/2020 | Geurts | B60J 7/1642 |
| 2010/0162588 | A1 * | 7/2010 | Newman | D06F 58/14<br>34/235 |
| 2011/0201263 | A1 * | 8/2011 | Srinivasan | B60H 1/248<br>454/141 |
| 2019/0118725 | A1 | 4/2019 | Strahan | |

* cited by examiner

*Primary Examiner* — Joseph J Hail
*Assistant Examiner* — Shantese L McDonald
(74) *Attorney, Agent, or Firm* — Christopher G. Darrow; Darrow Mustafa PC

(57) ABSTRACT

A drying system for a vehicle includes an airflow intake duct structured to be mountable to the vehicle so as to reside exterior of the vehicle. The airflow intake duct includes an intake duct airflow passage structured to receive an airflow therein from outside the vehicle when the vehicle is moving. An airflow duct is structured to be coupled to the intake duct so as to reside in an interior of the vehicle and so as to receive therein the airflow from the intake duct when the intake duct is mounted exterior of the vehicle. The airflow duct includes a plurality of holes structured to enable discharge of a portion of the airflow from the airflow duct into the interior of the vehicle.

10 Claims, 3 Drawing Sheets

DRYING SYSTEM FOR A VEHICLE

TECHNICAL FIELD

The present invention relates to vehicle accessories and, more particularly, to a system mountable in a vehicle interior for drying wet articles.

BACKGROUND

Items such as towels and clothing may become wet due to rain or participation of a user in recreational activities. The user may wish to dry such items as rapidly and as conveniently as possible. However, an extended period of time may elapse before the user can drive home or move to an area where wet items of clothing can be dried in a conventional, possibly time-consuming manner.

SUMMARY

In one aspect of the embodiments described herein, a drying system for a vehicle is provided. The drying system includes an airflow intake duct structured to be mountable to the vehicle so as to reside exterior of the vehicle. The airflow intake duct includes an intake duct airflow passage structured to receive an airflow therein from outside the vehicle when the vehicle is moving. An airflow duct is structured to be coupled to the intake duct so as to reside in an interior of the vehicle and so as to receive therein the airflow from the intake duct when the intake duct is mounted exterior of the vehicle. The airflow duct includes a plurality of holes structured to enable discharge a portion of the airflow from the airflow duct into the interior of the vehicle.

DETAILED DESCRIPTION

Figure 1:
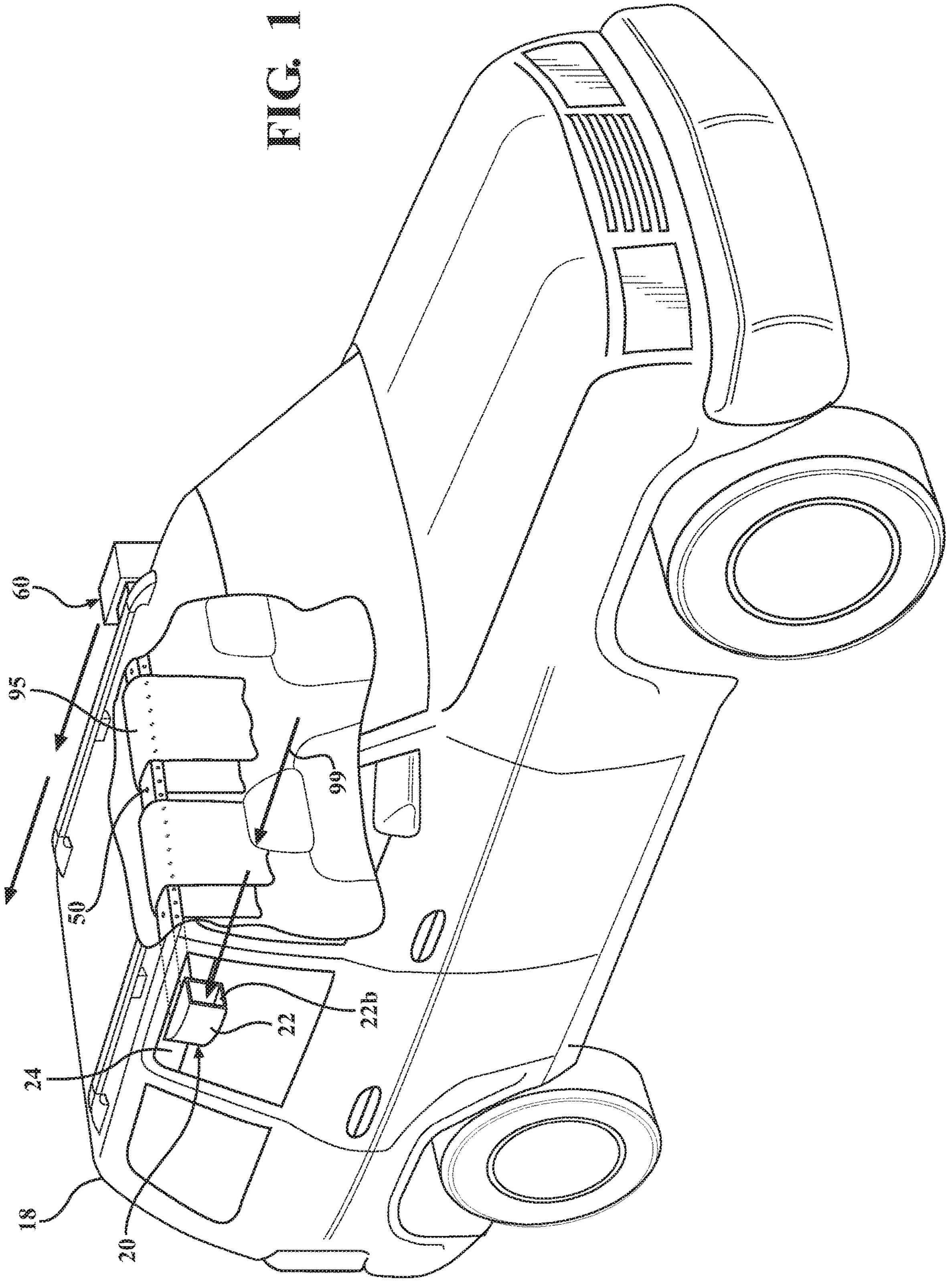
FIG. 1 is a schematic perspective view of a vehicle incorporating a system structured for drying articles in an interior of a vehicle, in accordance with an embodiment described herein.

Embodiments described herein relate to a drying system for a vehicle. The drying system may include an airflow intake duct structured to be mountable to the vehicle so as to reside exterior of the vehicle. The airflow intake duct may include an intake duct airflow passage structured to receive an airflow therein from outside the vehicle when the vehicle is moving. An airflow duct is structured to be coupled to the intake duct so as to reside in an interior of the vehicle and so as to receive therein the airflow from the intake duct when the intake duct is mounted exterior of the vehicle. The airflow duct may include a plurality of holes structured to enable discharge a portion of the airflow from the airflow duct into the interior of the vehicle. As the vehicle moves, air is drawn into the intake duct and passes into the airflow duct. Wet items such as towels or clothing may be hung over or near the airflow duct in the vehicle interior, to be dried by air flowing from the airflow duct holes. If desired, an impeller or fan may be incorporated into the drying system to increase air circulation.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments. In addition, each of the components described herein may be formed from a material (or materials) suitable for the purposes and structure of the component as described.

Figure 2:
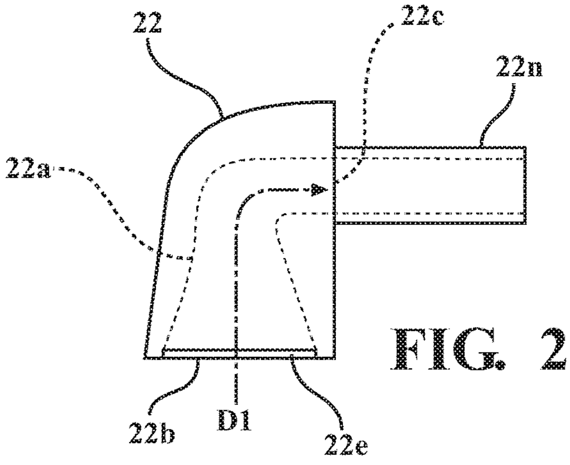
FIG. 2 is a schematic plan view of an airflow intake duct in accordance with an embodiment described herein.

FIG. 1 is a schematic perspective view of a vehicle incorporating a system 20 structured for drying articles in an interior of a vehicle, in accordance with an embodiment described herein. Referring to FIGS. 1 and 2, in one or more arrangements, the drying system 20 may include an airflow intake duct 22. The airflow intake duct 22 may define an intake duct airflow passage **22*a* structured to receive an airflow therein from outside the vehicle 18 when the vehicle is moving. Airflow intake duct 22 may define an intake duct entrance 22*b* structured to receive the airflow therein. An intake duct exit 22*c* may be spaced apart from the intake duct entrance 22*b*. The intake duct airflow passage 22*a* may extend between the intake duct entrance 22*b* and the intake duct exit 22*c***.

In one or more particular embodiments, a cross-sectional area of the intake duct airflow passage **22*a* may decrease proceeding in a direction D1 from the intake duct entrance toward the intake duct exit 22*c*. This narrowing of the intake duct airflow passage 22*a* may have the effect of increasing the speed of the airflow entering the airflow duct 50** (described in greater detail below).

A valve may be mounted on the airflow intake duct 22 to control the airflow 99 into the intake duct. In one or more arrangements, the valve may be in the form of a rolling, shutter-type door **22*e* positionable to block the intake duct entrance 22*b*. The door 22*e* may be securable in any of a variety of positions to control an open size of the intake duct entrance 22*b*, thereby controlling a flow rate of air into the airflow intake duct 22. Alternatively, other types of valves may be used to control airflow into the airflow intake duct 22 or through the airflow intake duct 22 into the airflow duct 50**.

Figure 3:
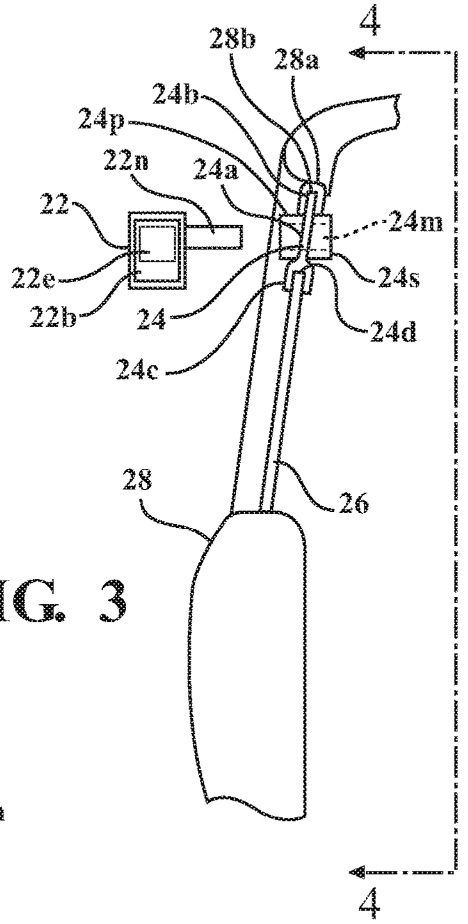
FIG. 3 is a schematic edge view of a portion of a vehicle door viewed from in front of the vehicle, showing mounting of a window adapter on the door and an airflow intake duct on the window adapter.
Figure 5:
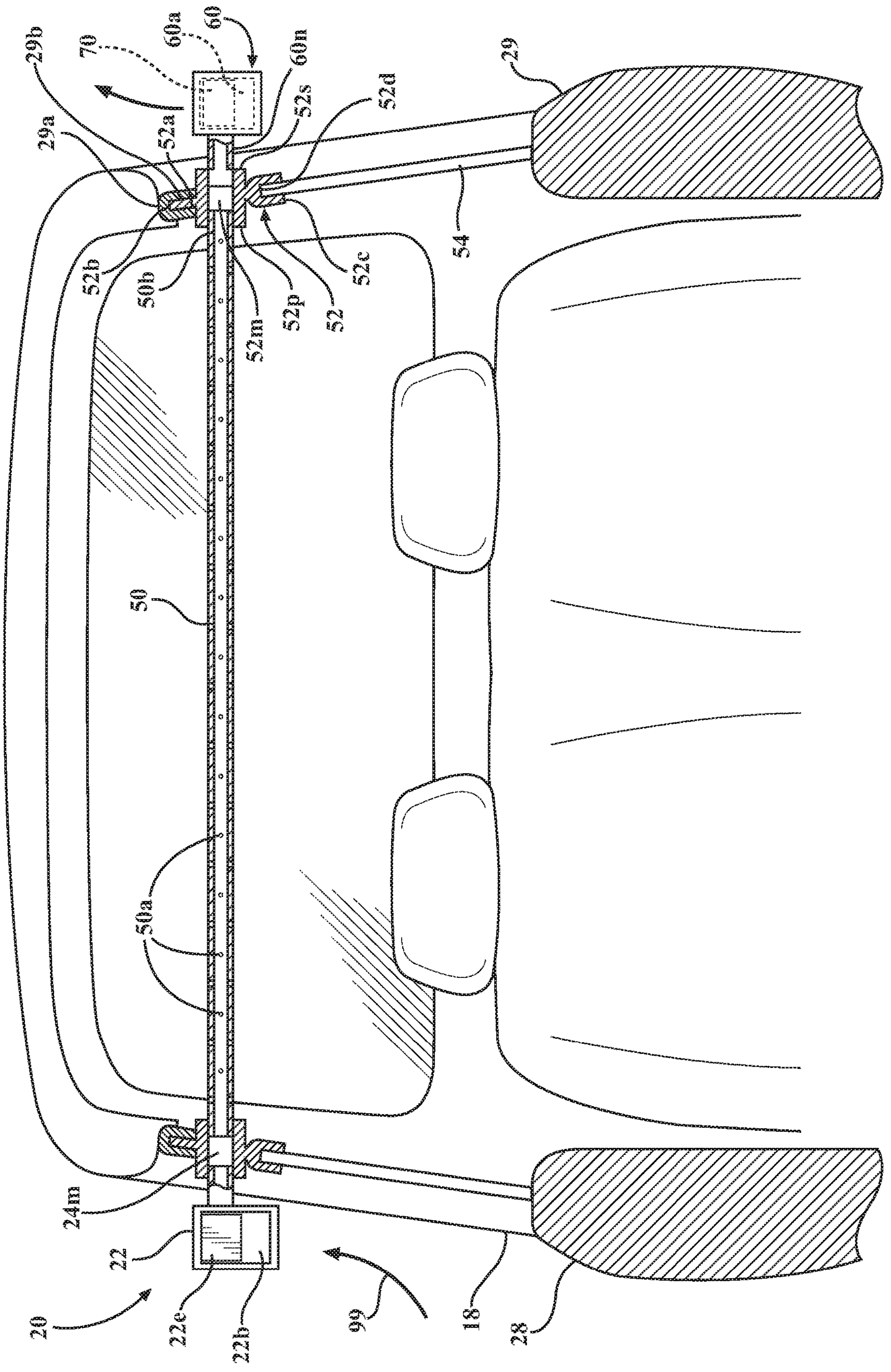
FIG. 5 is a schematic end view of a vehicle including opposed vehicle doors with window adapters mounted on the door windows for supporting a drying airflow duct therebetween, as viewed from in front of the vehicle.

As shown in FIGS. 1, 3, and 5, the airflow intake duct 22 may be structured to be mountable to the vehicle 18 so as to reside exterior of the vehicle, in a location selected to immerse the airflow intake duct 22 in an airflow passing over the vehicle 18 when the vehicle is moving. A portion 99 of the airflow passing over the vehicle 18 may then enter intake duct airflow passage **22*a* through intake duct entrance 22*b***.

Figure 4:
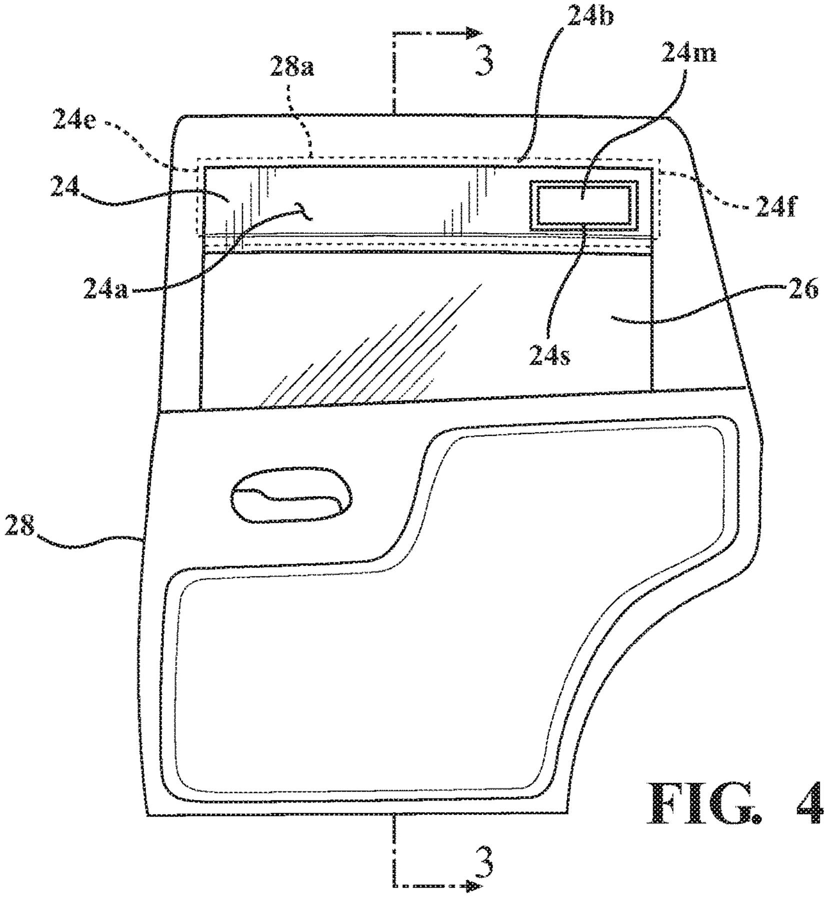
FIG. 4 is a schematic side view of the door shown in FIG. 3.

In one or more arrangements, the airflow intake duct 22 may be mounted to the vehicle 18 using a first window adapter 24. As shown in FIGS. 3-5, the first window adapter 24 may be structured to be mountable to a first vehicle window 26 so as to extend between the first vehicle window 26 and an uppermost portion 28_a_ of a first vehicle door 28 containing the first vehicle window, when the first vehicle window 26 is partially open.

The first window adapter 24 may be structured to form a substantially airtight seal with the vehicle door 28 and the window 26 when the first window adapter 24 is mounted in the partially open window. In one or more embodiments, the first window adapter 24 may include a planar body portion 24_a_ having a thickness equal to that of the window glass so that a first (upper) edge 24_b_ of the first window adapter 24 can fit into an existing window groove 28_b_ of the vehicle door 28. A second edge 24_c_ of the first window adapter 24 may have a groove or slot 24_d_ formed therein. Groove 24_d_ may be structured to receive an uppermost edge of the window 26 therein in a slight interference fit. Other (i.e., front and rear) edges 24_e_, 24_f_ (FIG. 4) of the first window adapter 24 may be similarly structured to fit inside associated front and rear portions of the window groove 28_b_ of the vehicle door 28. The first window adapter 24 may be formed from a suitable polymer, enabling edges of the adapters to be bent slightly to facilitate user insertion of the adapter edges into the window groove.

Referring to FIGS. 3 and 4, the first window adapter 24 may also include a first window adapter airflow passage 24_m_ extending from a first side of the first window adapter through the first window adapter to a second side of the first window adapter opposite the first side. The first window adapter 24 may also include an intake duct mounting sleeve 24_p_ extending from the first window adapter 24 along the first side of the first window adapter and defining a portion of the first window adapter airflow passage 24_m_. The intake duct mounting sleeve 24_p_ may be structured to receive therein a portion of the airflow intake duct 22 (for example, an intake duct nozzle 22_n_) for mounting the airflow intake duct 22 to the first window adapter 24. The intake duct mounting sleeve 24_p_ may be structured to form a gas-tight seal with the intake duct nozzle 22_n_ when the airflow intake duct 22 is coupled to the intake duct mounting sleeve 24_p_.

The first window adapter 24 may also include an airflow duct mounting sleeve 24_s_ extending from the first window adapter 24 along the second side of the first window adapter and defining a portion of the first window adapter airflow passage 24_m_. The airflow duct mounting sleeve 24_s_ may be structured to receive therein a first portion of the airflow duct 50 for mounting the airflow duct 50 to the first window adapter 24.

To mount the first window adapter 24 to the first vehicle door 28, the first vehicle window 26 may be rolled partially down. Then, an upper edge of the window 26 may be inserted into adapter groove 24_d_ and adapter edges 24_e_ and 24_f_ may be inserted into the door window groove 28_b_. The window 26 may then be rolled up until the upper edge 24_b_ of the adapter enters into the existing window groove 28_b_ of the vehicle door 28. Alternatively, adapters having other structures may be used as long as they act to fill the gap between the partially-open window and the uppermost portion of the vehicle door, provide an airflow passage therethrough, and also enable mounting of an intake duct and an airflow duct thereto, either directly or indirectly.

Airflow duct 50 may be structured to be coupled to the airflow intake duct 22 via airflow duct mounting sleeve 24_s_ and may be structured to form a gas-tight seal with the airflow duct mounting sleeve 24_s_. When coupled to airflow duct mounting sleeve 24_s_, the airflow duct 50 may extend through an interior of the vehicle as shown in FIG. 5. Airflow duct 50 may then receive the airflow 99 from the airflow intake duct 22 when the airflow intake duct 22 is mounted exterior of the vehicle 18.

The airflow duct 50 may include a plurality of holes 50_a_ structured to enable discharge of at least a portion of the airflow 99 from the airflow duct 50 into the interior of the vehicle. Thus, a portion of the airflow 99 may be discharged through holes 50_a_ to dry an item positioned proximate the airflow duct (for example, an item of clothing positioned to hang over the airflow duct 50). In one or more arrangements, the airflow duct 50 may have a telescoping structure including at least a pair of telescoping members. This enables the length of the airflow duct 50 to be adjusted for different vehicle widths.

In one or more arrangements, airflow duct 50 may extend from first window adapter 24 into the vehicle interior in cantilever fashion. In this case, portions of the aiflow 99 not discharged through the airflow duct openings 50_a_ may be discharged from a free, open end of airflow duct 50, into the vehicle interior and/or out of the vehicle through another open window. In other arrangements, an end 50_b_ of the airflow duct 50 may be supported by engagement with a second window adapter 52 mounted on a second window 54 of the vehicle 18. Second window 54 may be mounted in a second door 29 located opposite first door 28. As shown in FIG. 5, the second window adapter 52 may be structured to be mountable to second vehicle window 54 so as to extend between the second vehicle window 54 and a groove 29_b_ of an uppermost portion 29_a_ of a second vehicle door 29 containing the second vehicle window, when the second vehicle window 54 is partially open. The second window adapter 52 may be structured and mounted to the second vehicle window in the manner previously described with respect to the first window adapter 24.

The second window adapter 52 may be structured to form a substantially airtight seal with the second vehicle door 29 and the second window 54 when the adapter 52 is mounted in the partially open window. In one or more embodiments, the second window adapter 52 may include a planar body 52_a_ portion a having a thickness equal to that of the window glass so that a first (upper) edge 52_b_ of the second window adapter 52 can fit into an existing window groove 29_b_ of the vehicle door 29. A second edge 52_c_ of the second window adapter 52 may have a groove or slot 52_d_ formed therein. Groove 52_d_ may be structured to receive an uppermost edge of the window 54 therein in a slight interference fit. Other (i.e., front and rear) edges 52_e_, 52_f_ (not shown) of the adapter 52 may be similarly structured to fit inside associated front and rear portions of the window groove 29_b_ of the vehicle door 29, as descried previously with respect to first window 26 of shown in FIG. 4. The adapter 52 may be formed from a suitable polymer, enabling edges of the adapters to be bent slightly to facilitate user insertion of the adapter edges into the window groove.

The second window adapter 52 may also include a second window adapter airflow passage 52_m_ extending from a first side of the second window adapter 52 through the second window adapter to a second side of the second window adapter opposite the first side.

The second window adapter 52 may also include an airflow duct mounting sleeve 52_p_ extending from the second window adapter 52 along the first side of the second window adapter and defining a portion of the second window adapter airflow passage 52_m_. The airflow duct mounting sleeve 52_p_ may be structured to receive therein a portion of the airflow duct 50 for mounting the airflow duct 50 to the second window adapter 52. The airflow duct mounting sleeve 52_p_ may be structured to form a gas-tight seal with the airflow duct 50 when the airflow duct 50 is coupled to the airflow duct mounting sleeve 52*p*. When the airflow duct is thus coupled to the second adapter 52, a portion of the airflow 99 from the airflow duct may be received in the second window adapter airflow passage 52*m*.

The second window adapter 52 may also include a discharge duct mounting sleeve 52*s* extending from the second window adapter along the second side of the second window adapter and defining a portion of the second window adapter airflow passage 52*m*. The airflow duct mounting sleeve 52*s* may be structured to receive therein a portion of a discharge duct 60 (described below) for mounting the discharge duct 60 to the second window adapter 52.

To mount the second window adapter 52 to the second vehicle door 29, the second vehicle window 54 may be rolled partially down. Then, an upper edge of the window 54 may be inserted into adapter groove 52*d* and the adapter front and rear edges may be inserted into the window groove 29*b*. The window 54 may then be rolled up until the upper edge 52*b* of the adapter enters into the existing window groove 29*b* of the vehicle door 29.

In one or more arrangements, the portion of airflow 99 not discharged through airflow duct holes 50*a* may be discharged through the second adapter airflow passage 52*m* to the vehicle exterior. Alternatively, the portion of airflow 99 not discharged through airflow duct holes 50*a* may be discharged through the discharge duct 60.

In one or more arrangements, the discharge duct 60 may be mounted to the vehicle 18 using the second window adapter 52. For example, the discharge duct 60 may include a discharge duct nozzle 60*n* structured to be received in discharge duct mounting sleeve 52*s* so as to for a gas-tight seal. The airflow discharge duct 60 may include an airflow passage 60*a* extending therethrough. A portion of the airflow passage 60*a* may be defined by discharge duct nozzle 60*n*. The airflow discharge duct 60 may be structured to be coupled to the airflow duct 50 (via second adapter 52) so as to receive a portion of the airflow from the airflow duct 50 into the discharge duct airflow passage 60*a*. The airflow discharge duct 60 may be structured to discharge the airflow from the discharge duct airflow passage 60*a* to the outside of the vehicle when the vehicle is moving. Thus, the airflow discharge duct 60 may be structured to be mountable to the second window adapter 52 so that the airflow in the second window adapter airflow passage 52*m* is received in the airflow discharge duct airflow passage 60*a*.

In one or more arrangements, the airflow discharge duct airflow passage 60*a* may be structured to discharge air toward a rear of the vehicle. In one or more arrangements, an impeller or fan 70 may be incorporated into the airflow discharge duct 60 to aid in drawing air through the airflow duct 50 and into the discharge duct 60. The impeller may be positioned in the airflow discharge duct airflow passage 60*a* and may be structured to urge a portion of airflow 99 in a direction from the airflow duct 50 toward the discharge duct airflow passage.

The drying system 20 may be installed in the vehicle as previously described. The airflow duct 50 may extend cantilever fashion into the vehicle interior, or the airflow duct may be supported at each end by an associated window adapter. After installation, articles such as clothing or towels (elements 95 in FIG. 1, for example) may be hung over the airflow duct 50. Air discharged from the airflow duct holes 50*a* may operate to dry the suspended article(s) and may also act to help circulate the air inside the vehicle occupant compartment, which may further aid in drying the article(s). An opening through the second window adapter 52 or in the form of an open vehicle window 54 may provide an exit path for the air from the vehicle interior, thereby facilitating airflow through the interior. The impeller 70 may also be used to facilitate a greater rate of airflow.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A drying system for a vehicle, the drying system comprising:

an airflow intake duct structured to be mountable to the vehicle so as to reside exterior of the vehicle, the airflow intake duct including an intake duct airflow passage structured to receive an airflow therein from outside the vehicle when the vehicle is moving;

an airflow duct structured to be coupled to the intake duct so as to reside in an interior of the vehicle and so as to receive therein the airflow from the intake duct when the intake duct is mounted exterior of the vehicle, the airflow duct including a plurality of holes structured to enable discharge a portion of the airflow from the airflow duct into the interior of the vehicle; and a first window adapter structured to be connectible to the airflow intake duct and the airflow duct, the first window adapter being structured to be mountable to a first vehicle window so as to extend between the first vehicle window and an uppermost portion of a first vehicle door containing the first vehicle window when the first vehicle window is partially open, the first window adapter including a first window adapter airflow passage extending from a first side of the first window adapter through the first window adapter to a second side of the first window adapter opposite the first side.

2. The drying system of claim 1 wherein the airflow intake duct defines an intake duct entrance structured to receive the airflow therein, and an intake duct exit spaced apart from the intake duct entrance, wherein the intake duct airflow passage extends between the intake duct entrance and the intake duct exit, wherein a cross-sectional area of the intake duct airflow passage decreases proceeding in a direction from the intake duct entrance toward the intake duct exit.

3. The drying system of claim 1 wherein the first window adapter includes an intake duct mounting sleeve extending from the first window adapter along the first side of the first window adapter and defining a portion of the first window adapter airflow passage, the intake duct mounting sleeve being structured to receive therein a portion of the airflow intake duct for mounting the airflow intake duct to the first window adapter.

4. The drying system of claim 1 wherein the first window adapter includes an airflow duct mounting sleeve extending from the first window adapter along the second side of the first window adapter and defining a portion of the first window adapter airflow passage, the airflow duct mounting sleeve being structured to receive therein a first portion of the airflow duct for mounting the airflow duct to the first window adapter.

5. The drying system of claim 1 further comprising a second window adapter structured to be mountable to a second vehicle window so as to extend between the second vehicle window and an uppermost portion of a second vehicle door containing the second vehicle window when the second vehicle window is partially open, the second window adapter including a second window adapter airflow passage extending from a first side of the second window adapter through the second window adapter to a second side of the second window adapter opposite the first side, wherein the second window adapter is structured to be coupled to the airflow duct so that a portion of the airflow from the airflow duct is received in the second window adapter airflow passage.

6. The drying system of claim 5, further comprising an airflow discharge duct connected to the airflow duct, and wherein the airflow discharge duct is structured to be mountable to the second window adapter so that the portion of the airflow in the second window adapter airflow passage is received in the airflow discharge duct.

7. A drying system for a vehicle, the drying system comprising:

an airflow intake duct structured to be mountable to the vehicle so as to reside exterior of the vehicle, the airflow intake duct including an intake duct airflow passage structured to receive an airflow therein from outside the vehicle when the vehicle is moving;

an airflow discharge duct including an airflow passage extending therethrough and structured to be mountable to the vehicle so as to reside exterior of the vehicle; and an airflow duct extending between the intake duct and the discharge duct so as to reside in an interior of the vehicle and so as to receive therein the airflow from the intake duct, the airflow duct including a plurality of holes structured to enable discharge a portion of the airflow from the airflow duct into the interior of the vehicle, wherein the airflow discharge duct is connected to the airflow duct so as to receive a portion of the airflow from the airflow duct into the discharge duct airflow passage and to discharge the portion of the airflow from the discharge duct airflow passage to the exterior of the vehicle when the vehicle is moving.

8. The drying system of claim 7 further comprising an impeller positioned in the airflow discharge duct airflow passage and structured to urge the portion of the airflow in a direction from the airflow duct toward the discharge duct airflow passage.

9. The drying system of claim 7 wherein the airflow discharge duct is structured to discharge the portion of the airflow received in the airflow discharge duct in a direction toward a rear of the vehicle when the airflow discharge duct is mounted to the second window adapter.

10. A drying system for a vehicle, the drying system comprising:

an intake duct mounted along a first vehicle window exterior of the vehicle;

a discharge duct mounted along a second vehicle window exterior of the vehicle; and an airflow duct connecting the intake duct and the discharge duct and residing in an interior of the vehicle.

* * * * *